(12) United States Patent
Ueberle

(10) Patent No.: US 9,724,827 B2
(45) Date of Patent: Aug. 8, 2017

(54) MONITORING A KINEMATICALLY REDUNDANT ROBOT

(71) Applicant: KUKA Laboratories GmbH, Augsburg (DE)

(72) Inventor: Marc-Walter Ueberle, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 68 days.

(21) Appl. No.: 14/309,241

(22) Filed: Jun. 19, 2014

(65) Prior Publication Data

US 2014/0379126 A1 Dec. 25, 2014

(30) Foreign Application Priority Data

Jun. 19, 2013 (DE) .................. 10 2013 010 290

(51) Int. Cl.
*G01L 3/00* (2006.01)
*B25J 9/16* (2006.01)

(52) U.S. Cl.
CPC ... *B25J 9/1674* (2013.01); *G05B 2219/39319* (2013.01); *G05B 2219/40367* (2013.01); *Y10S 901/28* (2013.01)

(58) Field of Classification Search
CPC ......... G01L 3/00; B25J 9/1672; B25J 9/1694; B25J 9/1674; G05B 2219/3319; G05B 2219/40367; G05B 2219/39319; Y10S 901/28
USPC ................. 700/245; 702/44; 901/28
See application file for complete search history.

(56) References Cited

U.S. PATENT DOCUMENTS

| 4,725,965 A | 2/1988 | Keenan |
| 4,841,762 A | 6/1989 | Hunter |
| 8,594,847 B2 * | 11/2013 | Schreiber ............... B25J 13/085 |
| | | 700/258 |
| 2007/0120512 A1 | 5/2007 | Albu-Schaffer et al. |
| 2013/0345875 A1 * | 12/2013 | Brooks et al. ......... B25J 9/0087 |
| | | 700/259 |

(Continued)

FOREIGN PATENT DOCUMENTS

| CN | 102207988 A | 10/2011 | |
| DE | EP 1302285 A2 * | 4/2003 | ............ B25J 9/1692 |
| DE | 102005054575 B3 | 4/2007 | |

(Continued)

OTHER PUBLICATIONS

European Patent Office; Search Report in European Patent Application No. 14 00 1781 dated Jan. 22, 2015; 10 pages.

(Continued)

*Primary Examiner* — Khoi Tran
*Assistant Examiner* — Robert Nguyen
(74) *Attorney, Agent, or Firm* — Wood Herron & Evans LLP

(57) ABSTRACT

A method for monitoring a kinematically redundant robot includes detecting joint forces acting in the joints of the robot, determining an external work force between a robot-permanent reference point and an environment based on the detected joint forces, determining a further monitoring variable that is at least substantially independent of an external force acting on the robot-permanent reference point based on the detected joint forces, and monitoring the determined external work force and the determined further monitoring variable.

21 Claims, 1 Drawing Sheet

(56) References Cited

U.S. PATENT DOCUMENTS

2015/0355647 A1* 12/2015 Bitterolf ................ B25J 9/1638
                                                                      700/275
2017/0057095 A1*  3/2017 Oestergaard ........... B25J 9/1674

FOREIGN PATENT DOCUMENTS

| DE | 102007060682 A1 | 6/2009 |
| DE | 102010018440 A1 | 12/2010 |
| DE | 102011111758 A1 | 2/2013 |
| EP | 1302285 A2 | 4/2003 |
| EP | 1445075 A2 | 8/2004 |
| JP | H05220681 A | 8/1993 |

OTHER PUBLICATIONS

Hattori et al.; Plublication Entitled "A Realization of Compliant Motion by a Decentralized Control in Redundant Manipulator" dated Jul. 2001; 5 pages.
Owen et al.; Publication Entitled "On-line Trajectory Resolution for Two-armed Systems With Conflicting Performance Criteria" dated 2008; 17 pages.
De Luca et al.; Publication Entitled "Exploiting Robot Redundancy in Collision Detection and Reaction" dated Sep. 2008; 7 pages.
Sadeghian et al.; Publication Entitled "Null-Space Impedance Control With Distrurbance Observer" dated Oct. 2012; 6 pages.
Zlajpah; Publication Entitled "Control of Redundant Robots in Presence of External Forces" dated 1997; 6 pages.
German Patent Office; Office Action in German Patent Application No. 10 2013 010 290.1 dated Jan. 9, 2014; 5 pages.
Chinese Patent Office; Examination Report in Chinese Patent Application No. 201410276333.7 dated May 18, 2017; 5 pages.

* cited by examiner

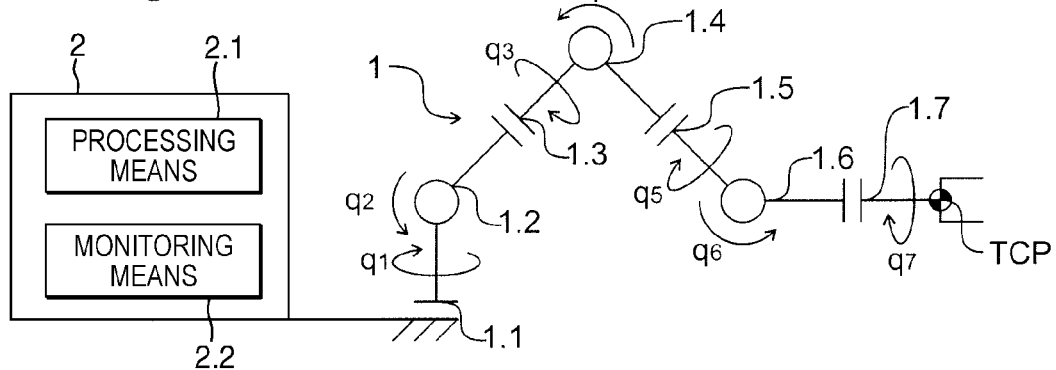
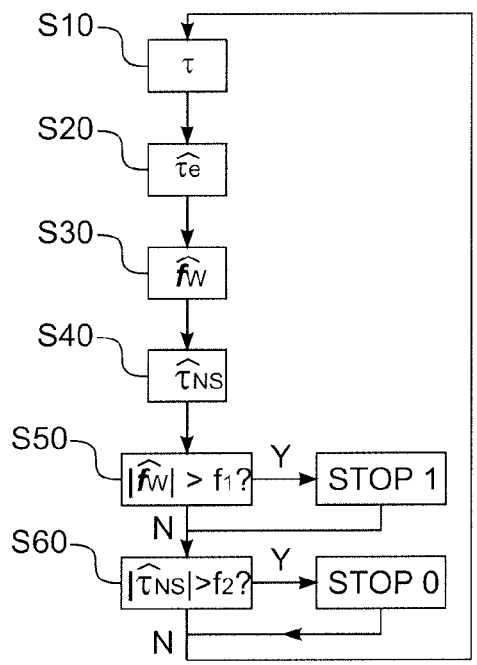

MONITORING A KINEMATICALLY REDUNDANT ROBOT

CROSS-REFERENCE

This application claims the benefit of German Patent Application No. 10 2013 010 290.1 (pending), filed Jun. 19, 2013, the disclosure of which is incorporated by reference herein in its entirety.

TECHNICAL FIELD

The present invention relates to a method for monitoring a kinematically redundant robot, and a robot having a control means and a computer program product having a programming code for executing a method of this type.

BACKGROUND

Robots can exert forces on their environment—for example, in joining operations—or unintentionally as well—in a collision for example—wherein, for a more compact design, anti-parallel pairs of forces are also present, i.e. torques, that in general are referred to as forces.

According to operating parameters, it is thus known to detect joint forces τ and to evaluate model-based externally induced joint forces $\hat{\tau}_e$ that result in the joints by a contact of the robot with the environment.

With kinematically redundant robots, working forces $\hat{f}_W$ in the workspace between a robot-permanent reference point, in particular the TCP (Tool Center Point) of the robot, and the environment, can be evaluated and monitored based on these joint forces, in particular by means of a so-called pseudoinverse of the transposed Jacobian matrix $(J^T)^\#$:

$$\hat{f}_W = (J^T)^\# \hat{\tau}_e$$

If the working force evaluated in this manner exceeds a threshold value at the TCP, a safety reaction is triggered, such that the robot is shut down, or moved back, for example.

In particular, measurement and modeling inaccuracies, which act on the pseudoinverse $(J^T)^\#$ can lead thereby to errors for the evaluated working force $\hat{f}_W$ at the robot-permanent reference point. Additionally, or alternatively, joint torques can be projected erroneously on a fictitious working force $\hat{f}_W$ acting on the TCP, due to contact forces acting on a point on the robot spaced apart from the TCP. In particular, if the joint forces resulting from this contact force spaced apart from the TCP are substantially located in the null space of the pseudoinverse of the transposed Jacobian matrix, then a quantitatively very small working force is evaluated and no safety reaction is triggered.

SUMMARY

The object of the present invention is to improve the operation of the kinematically redundant robot, in particular to reduce at least some of the disadvantages discussed above.

According to one aspect of the present invention, a kinematically redundant robot is monitored. A kinematically redundant robot is understood in the present context to be, in particular, a robot having a reference point permanently allocated thereto, in particular a tool (flange) coordinate system, or TCP ("Tool Center Point"), the Jacobian matrix J of which is not quadratic and/or does not have a complete rank, wherein the Jacobian matrix is defined in the standard format as a matrix for the partial derivation of the position or speed of the reference point x, permanently allocated to the robot, in the workspace according to the minimum, in particular, joint coordinates, or speeds, in particular joint angles, of the robot:

$$\frac{dx}{dt} = \frac{\partial x}{\partial q} \cdot \frac{dq}{dt} = J(q)\frac{dq}{dt}$$

Because the speed of the robot-permanent reference point has a maximum of three Cartesian, or translation, speeds, and three angular, or rotational, speeds (dim(x)≤6), a robot having seven or more joints (dim(q)≥7), in particular, is kinematically redundant. A robot having six or less joints can also be kinematically redundant if, for example, only the translation speeds of the robot-permanent reference point are taken into account, or, respectively, no rotational speeds are taken into account at the robot-permanent reference point.

In one embodiment, joint forces, in particular joint torques, which act on the joints of the robot, are detected, in particular by means of a detection means. The detection means can have one or more force sensors, in particular torque sensors, in a further development, which are disposed on one or more, preferably all, joint axes, in particular drive axes of joint drives for the robot. Additionally, or alternatively, motor currents for the joint drive and/or joint accelerations, can be detected, in particular by means of the detection means, and from this, joint forces, in particular joint torques, can be detected, in particular, evaluated.

Based on the detected joint forces, an external working force in the workspace, between a robot-permanent reference point and an environment of the robot, in particular a force to the TCP, is determined, in particular by means of a processing means.

For this, model based externally induced joint forces are evaluated, in one embodiment, based on the detected joint forces, by way of example, via a disturbance variable observer, or in that drive, tractive, gravitational, frictional, and/or similar, joint force components belonging to the robot are subtracted from the detected joint forces. If the robot is modeled in the standard manner by means of the movement equation $$M(q) \cdot \frac{d^2q}{dt^2} - h\left(q, \frac{dq}{dt}\right) = T$$

having the mass matrix M and the joint forces τ, the externally induced joint force $\hat{\tau}_e$ occurring in the joints through contact with the environment can be evaluated when the minimum coordinates for q are known. The detected, or determined by this means, externally induced joint forces are mapped, in one embodiment, by means of a linear mapping, in particular a pseudoinverse of a transposed Jacobian matrix for the robot-permanent reference point, onto the external working force:

$$\hat{f}_W = (J^T)^\# \hat{\tau}_e$$

The pseudoinverse of a (transposed) Jacobian matrix can, in particular, be defined in a standard format by means of $$J^\# = A^{-1} \cdot J^T \cdot (J \cdot A^{-1} \cdot J^T)^{-1} \text{ or}$$

$$(J^T)^\# = A^{-1} \cdot J \cdot (J^T \cdot A^{-1} \cdot J)^{-1}$$

with the weighting matrix A. This is the identity matrix in one embodiment, such that the pseudoinverse is the Moore- Penrose pseudoinverse. In another embodiment, the weighting matrix A is the mass matrix M for the robot.

Likewise, the external working force can also be determined by other means, based on the detected joint forces, for example, by measuring and storing pairs of detected, or determined by this means, externally induced joint forces and corresponding working forces and interpolation of these stored pairs for currently detected or determined joint forces.

In addition to the external working force, a further monitoring variable, which—at least substantially—is independent of an external force acting on the robot-permanent reference point, is then determined, according to one aspect of the present invention, based on the detected, or determined by this means, externally induced joint forces. This further monitoring variable can, in particular, depend on an external force, exerted on the environment, or experienced, respectively, by the robot at a point spaced apart from the robot-permanent reference point, in particular at a link or joint.

When the robot intentionally makes contact with the environment by means of the robot-permanent reference point, or, respectively, a force occurs on the robot-permanent reference point in the workspace, the further monitoring variable in one embodiment is, at least substantially, equal to zero, in particular with respect to model and/or measurement inaccuracies. Accordingly, it is possible to detect that the robot has made contact with the environment, in particular an obstacle, with a surface spaced apart from the robot-permanent reference point by means of a, in particular, significant, or sufficiently large, further monitoring variable. With model errors in the determination of the external working force, it is likewise possible that portions result, which affect the further monitoring variable. Accordingly, in addition to, or alternatively to, detecting an environment contact at a point spaced apart from the robot-permanent reference point, a modeling inaccuracy can also be identified, which leads to an incorrect determination of the external working force. Thus, in addition to, or alternatively to, detecting an environment contact at a point spaced apart from the robot-permanent reference point, the plausibility of the determination of the external working force can be checked.

In one embodiment, this further monitoring variable corresponds to an external force at a point spaced apart from the robot-permanent reference point. For this reason, it shall also be referred to below as a crushing force, without this designation being intended to limit the other external forces in any way. This crushing force can be determined in a manner analogous to that for the working force, in particular by means of measuring and storing pairs of joint forces and corresponding crushing forces, and the interpolation of these stored pairs for current joint forces, or by mapping the detected, or determined by this means, externally induced joint forces onto the external crushing force, by means of a pseudoinverse of a transposed Jacobian matrix for a robot surface spaced apart from the robot-permanent reference point, in particular a link or a joint.

In one embodiment, the further monitoring variable can be determined by multiplication of the joint forces with a null space projection operator of the pseudoinverse of the transposed Jacobian matrix for the robot-permanent reference point. The null space projection operator of a pseudoinverse of a transposed Jacobian matrix can be defined, in particular in the standard format, by $$B = [I - J^T \cdot (J^T)^\#]$$

with the identity matrix I. In other words, the portion of the detected, or determined by this means, externally induced joint forces is used as the further monitoring variable in one embodiment, which by means of the pseudoinverse of the transposed Jacobian matrix is mapped for zero:

$$\hat{f}_W = (J^T)^\# \cdot \hat{\tau}_e$$

$$\hat{\tau}_{NS} = [I - J^T \cdot (J^T)^\#] \cdot \hat{\tau}_e$$

This can also be physically reproduced: with a kinematically redundant robot, the minimum coordinates are mapped, or permanently clearly established, unambiguously at a position, in particular the position and/or orientation, of a robot-permanent reference point, or a robot surface spaced apart therefrom, respectively. Conversely, different minimum coordinates exist, however, for a position. Accordingly, external working forces at the robot-permanent reference point, in particular the TCP, are, in fact, clearly mapped for joint forces, in particular externally induced joint forces. Conversely, joint forces, in particular externally induced joint forces, may occur, however, corresponding to external crushing forces, which act, not on the robot-permanent reference point, but rather, on the robot surface spaced apart therefrom. Joint forces of this type can be partially or entirely hidden, or projected into the null space of this linear mapping, in the mapping of the joint forces onto the external working force, in particular through the pseudoinverse of the transposed Jacobian matrix. Accordingly, in one embodiment of the present invention, the null space portion of this linear mapping, in general, a mapping of detected, or determined by this means, externally induced joint forces, is monitored. By means of this monitoring variable, an (additional) contact with the environment by the redundant robot can be detected and/or a plausibility of the determined external working force can be checked.

Accordingly, in one embodiment, particularly by means of a monitoring means, the determined external work force and the further monitoring variable, in particular the determined external crushing force and/or the null space portion of the joint forces, in particular externally induced joint forces, are monitored and a safety reaction is triggered when the determined external work force or the further monitoring variable fulfill a monitoring condition. A force or a monitoring variable can, in one embodiment, fulfill a monitoring condition if a norm, in particular a quantitative or maximum norm, exceeds the force, or monitoring variable, respectively, or a portion thereof, in particular a sub-vector of the force, or monitoring variable, respectively, exceeds or falls below a given threshold value, in particular if a quantity of the work force, or monitoring variable, respectively, or a maximum component of the work force, or the monitoring variable, respectively, exceeds or falls below a given threshold value. By way of example, a work force can be divided into one sub-vector, corresponding to a physical one, two, or three dimensional force, and one sub-vector corresponding to a one, two, or three dimensional torque. These two sub-vectors, the quantities, maximum components, or suchlike, thereof, for example, can then be monitored respectively. The same applies to the further monitoring variable.

The monitoring conditions for the work force and for the further monitoring variable can be identical. Likewise, another monitoring condition can be provided for the further monitoring variable. In particular, it may be convenient to limit the monitoring variable more strongly than acceptable work forces, which are necessary for joining, for example. Accordingly, in one embodiment, a given threshold for the further monitoring variable is lower than for the work force.

The monitoring condition for the work force and/or the further monitoring variable can be defined such that they can be varied in one embodiment. In particular, a given threshold value for the further monitoring variable and/or the work force can be such that it can be parameterized.

If the determined external work force fulfills the given monitoring condition, a safety reaction is triggered, preferably a STOP 0, a STOP 1, or a STOP 2, or a retreating movement of the robot. If the determined further monitoring variable fulfills the given monitoring condition, the same safety reaction can be triggered as that triggered when the monitoring condition for the work force has been fulfilled. Likewise, a safety reaction differing from that for the work force can be triggered if the determined further monitoring variable fulfills the given monitoring condition, in particular a higher level STOP (such as a STOP 0 for the further monitoring variable, as opposed to a STOP 1 for the work force), or an evasive movement, in particular a reorientation can be triggered, while maintaining a position of the robot-permanent reference point.

According to one aspect of the present invention, a robot has a control means, which is configured for executing a method described herein. According to one aspect, a computer program product, in particular a computer readable storage medium, has a program code, which is configured for executing a method described herein, when the program is executed by a control means for the robot.

A means, as meant in the present invention, can be designed as hardware and/or software, in particular a digital data processing unit, in particular a microprocessor unit (CPU), preferably connected to a storage unit and/or a bus system, and/or having one or more programs or program modules. The CPU can be designed to process commands, which are implemented in the form of a program installed in a storage system, to detect input signals from a data bus, and/or to issue output signals to a data bus. A storage system can have one or more, in particular different, storage mediums, in particular optical, magnetic, solid state and/or other non-volatile mediums. The program can be created such that it embodies the procedures described herein, or is capable of executing said procedures, respectively, such that the CPU executes the steps of such procedures, and thus, in particular, can monitor the robot.

One embodiment of the present invention can be illustrated as follows: with a kinematically redundant robot, joint forces, in particular externally induced joint forces, on one hand, are mapped onto an external work force that acts on a robot-permanent reference point, in particular a TCP. This external work force is monitored, and upon exceeding a given threshold, triggers a safety reaction.

With this mapping, in one embodiment, seven or more joint forces of the robot having seven or more axes are mapped onto a maximum of six components of the external work force (three components of a continuous force vector and three components of a discontinuous torque vector). Consequently—due to the mapping via the pseudoinverse—not all of the information pertaining to the joint forces is made use of. Instead, joint forces resulting from an external crushing force are hidden by this mapping.

For this reason, in one embodiment, the joint forces, in particular the externally induced joint forces, on the other hand, are mapped onto a further monitoring variable, which—at least substantially—is independent of an external force acting on the robot-permanent reference point. This further monitoring variable also triggers a safety reaction when a given threshold value has been exceeded. If, in a further development, the null space projection operator for the mapping onto the work force is used for the mapping of the further monitoring variable, then the hidden null space portion of the joint forces, i.e. the previously unused information from the joint forces, is made use of. Because both external crushing forces, which have no, or very little, effect on the TCP, as well as modeling inaccuracies that effect a further monitoring variable determined in this manner, can be used to check the plausibility of the determined work force, in particular, the accuracy of this fundamental modeling, and additionally, or alternatively, an external crushing force, with which the redundant robot can crush an obstacle, can be checked.

In general, according to one aspect of the present invention, a further monitoring variable is determined, based on joint forces that can also occur at a robot-permanent reference point, which, at least substantially, is not subjected to forces, or can occur without an external work force being applied to the robot-permanent reference point, respectively. If this further monitoring variable exceeds a given threshold value, a safety reaction is triggered.

BRIEF DESCRIPTION OF THE FIGURES

Further advantages and features can be derived from the dependent claims and the embodiment examples. For this, shown are, in part schematically:

FIG. 1: a robot according to one embodiment of the present invention; and

FIG. 2: a method according to one embodiment of the present invention.

DETAILED DESCRIPTION

FIG. 1 shows a kinematically redundant seven-axis light-weight robot 1 according to one embodiment of the present invention, having seven joints, exhibiting the joint angles $q_1$–$q_7$=q, a TCP on a tool (flange) and a control means 2, which executes a process according to one embodiment of the present invention, which shall be explained in greater detail below with reference to FIG. 2.

In a step S10, joint torques $\tau_1$–$\tau_7$=$\tau$ are detected by means of joint torque sensors 1.1-1.7 of a detection means in the control means 2 for detecting joint forces. From these, in a step S20, model-based externally induced joint forces $\hat{\tau}_e$ are evaluated by a processing means 2.1 in the control means 2, in that tractive, gravitational, drive, and similar, robot-internal components are subtracted from the detected joint forces $\tau$.

In a step S30, the externally induced joint forces $\hat{\tau}_e$ determined in this manner are mapped on the external work force by multiplication with the pseudoinverse of the transposed Jacobian matrix of the TCP weighted with the mass matrix M of the robot 1:

$$\hat{f}_W = (J^T)^\# \hat{\tau}_e$$

In a step S40, a further monitoring variable is determined in advance, parallel to, or subsequently, by means of the processing means, from the externally induced joint forces $\hat{\tau}_e$ by multiplication with the null space projection operator of this transposed Jacobian matrix:

$$\hat{\tau}_{NS} = [I - J^T \cdot (J^T)^\#] \hat{\tau}_e$$

In steps S50, S60, a monitoring of whether a quantity for the work force (step S50) or the further monitoring variable (step S60) exceeds a given threshold value $f_1$ or $f_2$, respectively, is carried out by means of a monitoring means 2.2 in the control means 2. If this is the case ("Y" in step S50, or S60, respectively), a STOP 1 (when the threshold value $f_1$ is exceeded by the work force), or a STOP 0 (when the threshold value $f_2$ is exceeded by the further monitoring variable), is triggered. Processing and monitoring means can be implemented, in particular, by a computer configured accordingly in terms of its programming.

LIST OF REFERENCE SYMBOLS 1 redundant robot
1.1-1.7 joint force sensors (detection means)
2 control means
2.1 processing means
2.2 monitoring means
$q_1$-$q_7$ joint angles (minimum coordinates)
TCP Tool Center Point (robot-permanent reference point)

What is claimed is:

1. A method for monitoring a kinematically redundant robot, the method comprising:
   detecting joint forces acting in joints of the robot;
   determining an external work force between a robot-permanent reference point and an environment based on the detected joint forces;
   determining, based on the detected joint forces, a further monitoring variable which is at least substantially independent of an external force acting on the robot-permanent reference point;
   monitoring the determined external work force and the determined further monitoring variable; and
   controlling the robot with a controller based on at least one of the determined external work force or the determined further monitoring variable.

2. The method of claim 1, further comprising:
   triggering a first safety reaction when the determined external work force fulfills a first variably definable monitoring condition; and
   triggering the first safety reaction or a second safety reaction when the determined further monitoring variable fulfills the first monitoring condition or a second monitoring condition.

3. The method of claim 2, wherein the second monitoring condition is a variably pre-definable monitoring condition.

4. The method of claim 1, wherein the further monitoring variable comprises an external force spaced apart from the robot-permanent reference point.

5. The method of claim 2, wherein the further monitoring variable comprises an external force spaced apart from the robot-permanent reference point.

6. The method of claim 1, wherein the joint forces are mapped onto the external work force by a first linear mapping.

7. The method of claim 2, wherein the joint forces are mapped onto the external work force by a first linear mapping.

8. The method of claim 4, wherein the joint forces are mapped onto the external work force by a first linear mapping.

9. The method of claim 5, wherein the joint forces are mapped onto the external work force by a first linear mapping.

10. The method of claim 6, wherein the first linear mapping is a pseudoinverse of a transposed Jacobian matrix for the robot-permanent reference point.

11. The method of claim 7, wherein the first linear mapping is a pseudoinverse of a transposed Jacobian matrix for the robot-permanent reference point.

12. The method of claim 8, wherein the first linear mapping is a pseudoinverse of a transposed Jacobian matrix for the robot-permanent reference point.

13. The method of claim 9, wherein the first linear mapping is a pseudoinverse of a transposed Jacobian matrix for the robot-permanent reference point.

14. The method of claim 10, wherein the same joint forces are mapped onto the further monitoring variable by a second linear mapping.

15. The method of claim 11, wherein the same joint forces are mapped onto the further monitoring variable by a second linear mapping.

16. The method of claim 12, wherein the same joint forces are mapped onto the further monitoring variable by a second linear mapping.

17. The method of claim 13, wherein the same joint forces are mapped onto the further monitoring variable by a second linear mapping.

18. A method for monitoring a kinematically redundant robot, the method comprising:
   detecting joint forces acting in joints of the robot;
   determining an external work force between a robot-permanent reference point and an environment based on the detected joint forces;
   determining, based on the detected joint forces, a further monitoring variable which is at least substantially independent of an external force acting on the robot-permanent reference point; and
   monitoring the determined external work force and the determined further monitoring variable;
   wherein the joint forces are mapped onto the external work force by a first linear mapping;
   wherein the first linear mapping is a pseudoinverse of a transposed Jacobian matrix for the robot-permanent reference point;
   wherein the same joint forces are mapped onto the further monitoring variable by a second linear mapping; and
   wherein the second linear mapping is a null space projection operator of the pseudoinverse of the transposed Jacobian matrix for the robot-permanent reference point.

19. A computer program product, comprising:
   a non-transitory computer readable storage medium; and
   a program stored on the non-transitory computer readable storage medium that, when executed by a processing unit, causes the processing unit to:
   detect joint forces acting in joints of a kinematically redundant robot,
   determine an external work force between a robot-permanent reference point and an environment based on the detected joint forces,
   determine, based on the detected joint forces, a further monitoring variable which is at least substantially independent of an external force acting on the robot-permanent reference point,
   monitor the determined external work force and the determined further monitoring variable, and
   control the robot based on at least one of the determined external work force or the determined further monitoring variable.

20. A robot, comprising:
   a plurality of joints; and
   a control configured for executing the method of claim 1, the control comprising:
   a detection means for detecting joint forces,
   a processing means for determining the external work force and further monitoring variable, and a monitoring means for monitoring the determined external work force and the determined further monitoring variable.

21. The robot of claim 20, comprising at least seven joints.

* * * * *